United States Patent [19]

Matsui

[11] Patent Number: 4,848,990
[45] Date of Patent: Jul. 18, 1989

[54] DUST COLLECTOR ADAPTED FOR USE IN A HOPPER DRYER

[75] Inventor: Osamu Matsui, Osaka, Japan

[73] Assignee: Matsui Manufacturing Co., Ltd., Osaka, Japan

[21] Appl. No.: 203,004

[22] Filed: Jun. 6, 1988

[51] Int. Cl.⁴ ............................................. B01D 46/02
[52] U.S. Cl. ........................................ 55/378; 55/429; 55/498; 55/505; 55/510; 55/523
[58] Field of Search .................. 55/300, 304, 378, 429, 55/493, 498, 503–505, 510, 521, 515–517, 523

[56] References Cited

U.S. PATENT DOCUMENTS

| | | | |
|---|---|---|---|
| 3,895,929 | 7/1975 | Jysky et al. | 55/429 X |
| 4,560,477 | 12/1985 | Moldow | 55/498 X |
| 4,759,781 | 7/1988 | Olson | 55/273 |
| 4,764,191 | 8/1988 | Morelli | 55/498 X |
| 4,767,427 | 8/1988 | Barabas et al. | 55/493 |

*Primary Examiner*—Charles Hart
*Attorney, Agent, or Firm*—Koda and Androlia

[57] ABSTRACT

A dust collector adapted for use in a hopper dryer including an outer rigid member and an inner filter member which is provided concentrically with the outer rigid member, the outer rigid member having a number of pores punched in its peripheral surface and the inner filter member having a filter element corrugated axially of the filter member.

4 Claims, 3 Drawing Sheets

DUST COLLECTOR ADAPTED FOR USE IN A HOPPER DRYER

BACKGROUND OF THE INVENTION

1. Field of the Invention

The present invention relates to a dust collector used in a hopper dryer, and more particularly to a dust collector for removing dust entrained in waste dry gas exhausted from a dry furnace which is designed to dehumidify material such as plastic pellets.

2. Prior Art

In treating powdery substances in a plastic molding process, a cyclone in usually employed as a dust collector. The cyclone is a conical vessel wherein airborne dust is extracted via centrifugal force. More specifically, airborne dust is urged to come down along the wall of the vessel by the force of gravity and is collected at the bottom thereof. Then, purified air is blown out of the vessel through the top thereof.

However, the method which uses cyclones described above has disadvantages such as lightweight dust is likely to be trapped in the air because the upstream air overcome the weight of the dust and then diffuses into the atmosphere, causing the environment to be contaminated. Also, if the amount of the air is too small, airborne dust is difficult to separate therefrom. To overcome these problems and increase dust collect efficiency, a small-size cyclone is used. However, pressure loss becomes greater, and the expected collection efficiency cannot be achieved.

SUMMARY OF THE INVENTION

Accordingly, a primary object of the present invention is to provide a dust collector which solves the problems formed in conventional cyclones.

Another object of the present invention is to provide a dust collector having increased collection efficiency irrespective of the relatively compact size.

The objects of the invention are accomplished by a dust collector which includes an outer rigid member and an inner filter member which is provided concentrically with the outer rigid member, the outer rigid member having a number of pores punched in its peripheral surface, and the inner filter member being a corrugated filter.

Other objects and advantages of the present invention will become more apparent from the following detailed description, when taken in conjunction with the accompanying drawings which show, for the purpose of illustration only, one embodiment in accordance with the teachings of the present invention.

DETAILED DESCRIPTION OF THE INVENTION

Figure 2:
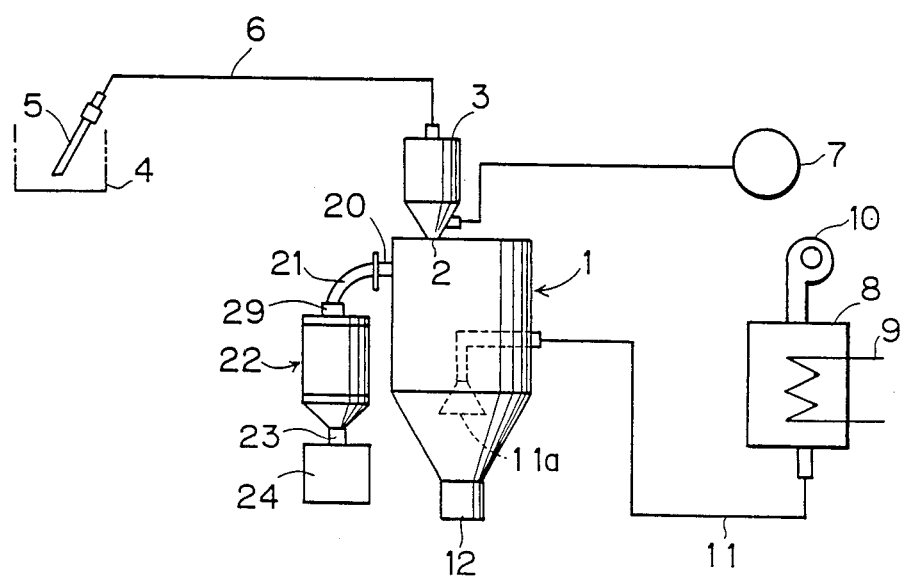
FIG. 2 is a diagrammatic view showing an example of a plastic molding system including the dust collector of the present invention.

FIG. 2 is a diagram showing a plastic molding system wherein a material in the form of pellets is supplied into a tank 4. The pellets are then sucked through a nozzle 5 and transferred through a duct 6 by suction provided by a blower 7. The pellets are collected in a hopper 3 and led into a dry furnace 1 through an inlet 2. The dry furnace 1 is commonly called a hopper dryer and is designed to dehumidify the pellets using dry gas sent from a dry gas supplying unit. The dry gas supplying unit includes a gas source 10, a heater unit 8 having a heater element 9, which dries up the moisture-containing gas, and a supply pipe 11 having a terminating end 11a which extends into the dry furnace 1. The temperature of the heater element is between 40° C. and 180° C., preferably 130° C. After the pellets are dehumidified in the dry furnace 1, they are introduced into a molding machine (not shown) through an outlet 12 of the dry furnace 1.

The dry furnace 1 is provided with gas outlet 20 through which dirty dry gas is led into a dust collector 22 through a duct 21. The dust collector 22 is connected to a dust box 24 through a dust discharge outlet 23.

Figure 1:
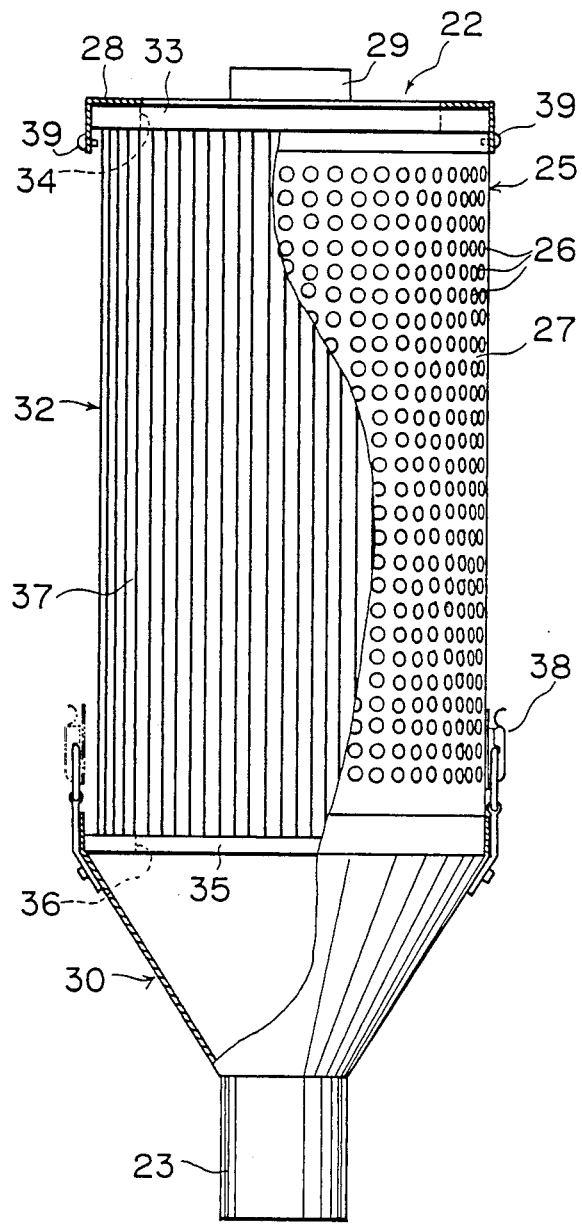
FIG. 1 is a partially cross-sectional front view showing the dust collector according to the present invention.
Figure 3:
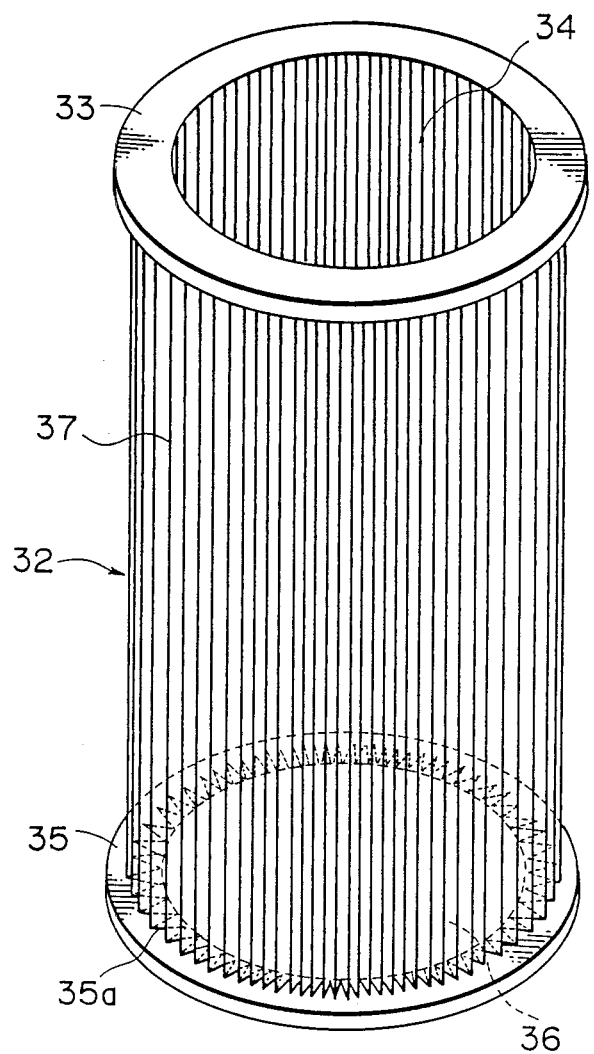
FIG. 3 is a perspective view showing a filter unit used in the dust collector.

The dust collector 22 has a double-walled structure. More specifically, as seen in FIG. 1, it includes an outside cylindrical member 25 and an inside filter member 32. The outside cylindrical member 25 has a rigid body 27 having numerous pores 26 punched in its peripheral surface. This cylindrical member is made out of metal or heat-resistant plastics. The filter member 32 has a filter element 37 as seen in FIG. 3. the top of the outside cylindrical member 25 is fixed to an upper lid 28 by means of rivets 39. The upper lid 28 is provided with the gas inlet 29, and the bottom of the outside cylindrical member 25 is detachably connected to an inverted funnel-shape lower lid 30 by means of clips 38. The top of the outside cylindrical member 25 can be detachably connected to the upper lid 28 by clips, and the bottom of the cylindrical member 25 is fixed to the lower lid 30 by rivets. The lower lid 30 includes the dust discharge outlet 23. The filter member 32 is fixed to an upper circular frame 33 and a lower circular frame 35 having gas passageways 34 and 36 respectively.

When assembling the outside cylindrical member 25 and the filter member 32 into a unit, the upper lid 28 and the upper circular frame 33 are concentrically joined to each other, and likewise the lower circular frame 35 and the lower lid 30 are joined together. If it is desired to have any space therebetween, a spacer can be provided.

The upper circular frame 33 is closely in contact with the upper lid 28, and so is the lower circular frame 35 with the lower lid 30. The space between the filter member 32 and the rigid body 27 is, for example, 14 mm. However, these two elements can be in close contact with each other.

The filter element 37, which is made of a heat-proof, releasable material such as plastic, ceramic or metal, is axially corrugated as best shown in FIG. 3. For facilitating fixing the filter element 37 to the frames 33 and 35, either both or one of the frames is provided with mortises having the same cross-section as the filter element 37, so that edge(s) of the filter element fits therein. Providing the mortises is advantageous in that they prevent the dust from sticking to the inside wall of the flanges. They are particularly advantageous on the lower flange where dust tends to gather. The dust box 24 stores the dust which is removed from the dirty gas and is preferably made of a transparent material so that the operator can observe the inside of the box. Dust sticking to the corrugated filter element 37 can be removed by shaking or beating it.

According to the present invention the following advantages result:

Because of the corrugated structure, the filter element 37 has a relatively large filtration area over which dirty gas diffuse. During this diffusion, the flow speed of the gas is reduced. As a result, a possible pressure loss is minimized, and the collection efficiency can be increased, In addition, the filtered gas is subjected to drag provided by the cylindrical member 25 and equally distributed into the pores 26 of the cylindrical member 25. When the gas passes through the pores 26, secondary filtering is effected. Thus, the collection efficiency as a whole is increased overall.

Another advantage is that since the filter element 37 is enclosed by a rigid cylindrical member 25, it is protected against the possibility of detrimental external forces. It has been found that the dust collector of the present invention also facilitates the introduction of the raw gas into the dry furnace from the gas supply source 10. Dust removed from the gas is collected in the dust box 24, thereby preventing it from dispersing the outside. This obviates the possibility of environmental contamination and is further advantageous.

I claim:

1. A dust collector adapted for use in a hopper dryer, said hopper dryer drying materials supplied thereinto via dry gas and said collector being connected to a gas outlet of said hopper dryer, said collector comprising:

an outer rigid member and an inner filter member which is provided concentrically with said outer rigid member, said outer rigid member having a number of pores provided in its peripheral surface, said inner filter member comprising a filter element, the cross section of said filter element being corrugated axially to said filter member;

said outer rigid member being fixed to an upper lid at its top and to a lower lid at its bottom, and said inner filter member being fixed to an upper circular frame at its top and to a lower circular frame at its bottom; and said inner filter member being detachably provided in said outer rigid member so that said upper circular frame and lower circular frame of said inner filter are held by said upper lid and lower lid of said outer rigid member.

2. A dust collector as defined in claim 1, further comprising a dust box connected to a bottom of said dust collector.

3. A dust collector as defined in claim 1, wherein said inner filter member is fixed to a supporting means by fitting in mortises cut in said supporting means such that said mortises have the same cross-section as said corrugated filter member.

4. A dust collector as defined in claim 3, wherein said outer rigid member is detachably mounted to said lower lid.

* * * * *